United States Patent
Arkhangelsky et al.

[15] 3,704,521
[45] Dec. 5, 1972

[54] INSTRUMENT FOR CHECKING LINE OF CONTACT OF SPUR GEARS FOR STRAIGHTNESS AND NOMINAL DIRECTION

[72] Inventors: Lev Arkadievich Arkhangelsky; Ljubov Mikhailovna Semenova, both of Moscow, U.S.S.R.

[73] Assignee: Bjuro Vzaimozamenyaemosti V. Metalloobrabatyvajuschei Promyshlennosti, Moscow, U.S.S.R.

[22] Filed: Sept. 2, 1969

[21] Appl. No.: 854,611

[52] U.S. Cl. ........................ 33/179.5 R, 33/179.5 D
[51] Int. Cl. ........................... G01b 3/20, G01b 5/20
[58] Field of Search ............................... 33/179.5

[56] References Cited

UNITED STATES PATENTS 2,230,816  2/1941  Semar ............................ 33/179.5
2,895,227  7/1959  Wagner et al. .................. 33/179.55

FOREIGN PATENTS OR APPLICATIONS 418,657     11/1963  Switzerland .................... 33/179.5
1,156,566   2/1956   Germany ........................ 33/179.5

*Primary Examiner*—Leonard Forman
*Assistant Examiner*—Paul G. Foldes
*Attorney*—Waters, Roditi, Schwartz & Nissen

[57] ABSTRACT

Method and apparatus for checking the line of contact of helical gears in which a measuring carriage with a tangential measuring instrument acts on a measuring head, when the carriage is moving along a guide, to move the head through an angle equal to the spiral angle on the pitch cylinder of the gear being measured. The apparatus also comprises a removable blade for determining the point on the edge of the tangential measuring instrument which contacts the line of contact at the pitch cylinder of the gear.

3 Claims, 6 Drawing Figures

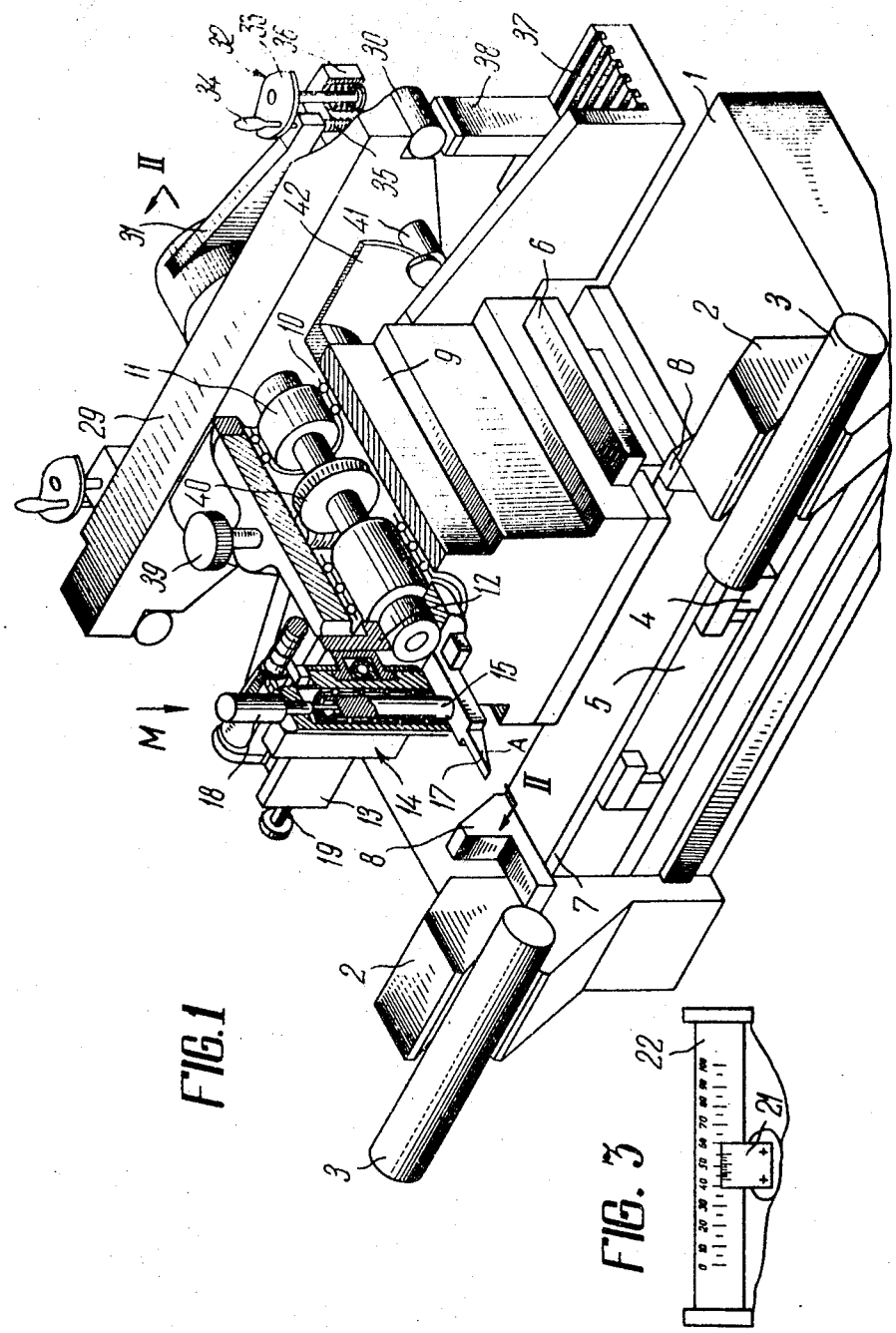

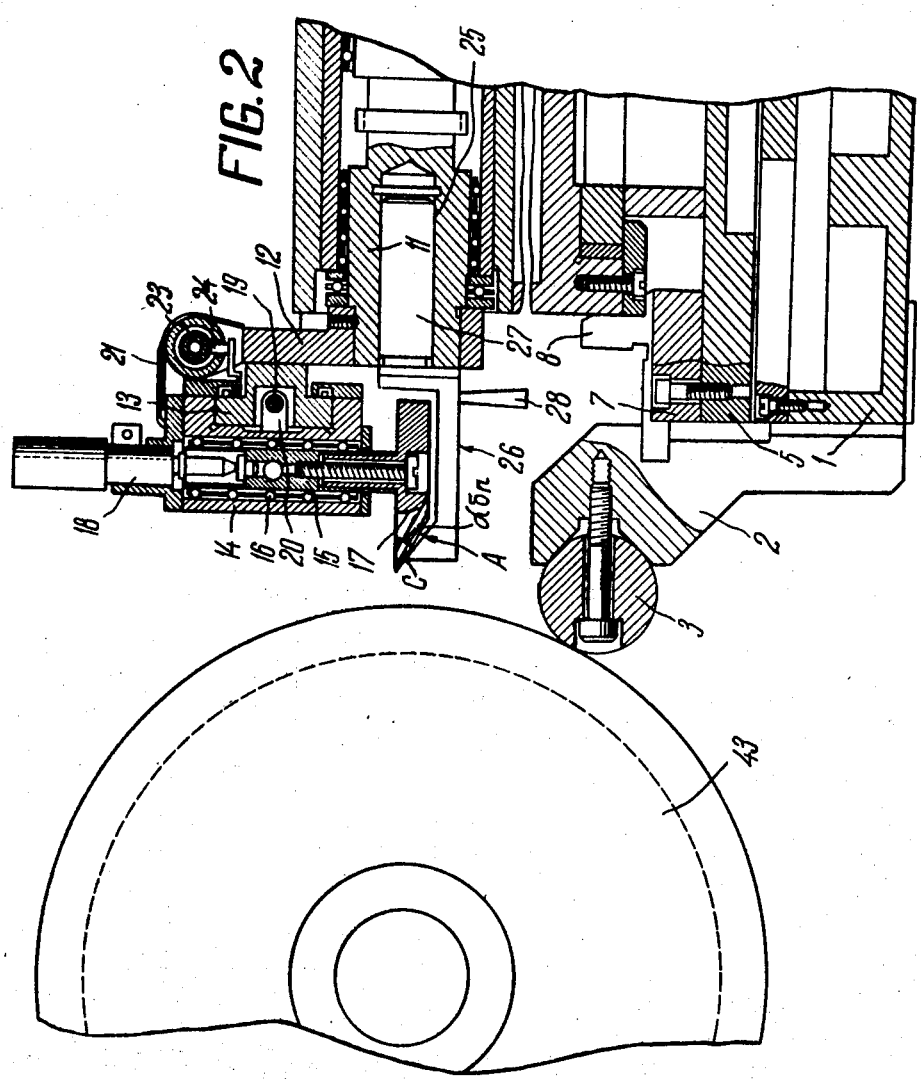

INSTRUMENT FOR CHECKING LINE OF CONTACT OF SPUR GEARS FOR STRAIGHTNESS AND NOMINAL DIRECTION

The present invention relates to methods and means for checking gears and more specifically it relates to means for checking the line of contact of spur gears, mainly of large helical gears.

One of the important characteristics of gears is their line of contact since it gives an idea of the fullness of contact between the mating surfaces of teeth.

The line of contact is checked both for straightness and direction and this check is aimed at ensuring the contact of the tooth along its face width which guarantees quiet operation of the gear drive and prevents irregular wear of the gear teeth.

Straightness of the line of contact is checked by moving a measuring feeler, usually tangential (whose measuring edge is inclined to the axis of the gear being measured at normal pressure angle $\alpha \eta n$ at pitch cylinder), along the line of contact of the teeth and reading the deviations of this point by means of a measuring head in the form of an indicator or transducer by registering them in the form of a chart made by a recording device.

In the known instruments the tangential measuring feeler with the measuring head is installed on a measuring carriage mounted on a slide which can move towards the center of the measured gear for bringing said measuring feeler in contact with the surface of the tooth of the measured gear. In the course of the check the guide of the measuring carriage is turned through an angle which is equal to the spiral or helix angle on the pitch cylinder, or the gear itself is turned through this angle with relation to the carriage guide.

While checking the gears, particularly large, high-speed and heavily loaded helical gears it is necessary to determine the beginning of the tooth flank with a view to ensuring quiet operation and absence of vibration.

The beginning of the flank can be determined by means of involute gauges. However, the existing involute gauges located on the gear being measured fail to ensure the requisite accuracy owing to their bulkiness and unreliability of location and because there are no stand-type involute gauges for large gears with diameters over 1,000 mm.

Inasmuch as the tooth surface always has a line of contact crossing the flank, it seems possible to determine the beginning of the flank while checking the line of contact.

However, the existing method of measurement and instruments cannot be used for this purpose.

An object of the present invention resides in providing an method instrument for checking the line of contact for said method and instrument being capable of determining the beginning of the flank in gears, particularly large helical gears.

The method for checking the line of contact according to the invention consists in that the measuring feeler is brought in contact with the surface of the tooth at the pitch point and then, moving said measuring point along the line of contact it is possible to compare the actual distance covered by the measuring point from the pitch point to the beginning of the flank with the design length of the line of contact from the pitch point to the beginning of the flank.

The instrument for checking the line of contact of spur gears, particularly large helical ones, according to the invention comprises elements for location on the addendum circle diameter of the gear being measured, said elements being positioned on the base, a slide mounted on said base and being capable of moving towards said elements, a measuring carriage placed on a guide which is linked with said slide, a device for turning said guide through an angle equal to a helix angle of the tooth of the gear being measured at pitch cylinder, a measuring head secured on said measuring carriage, a tangential measuring feeler mounted on said measuring carriage and effecting upon the measuring head during the carriage movement, and a device for indicating the position of said carriage on the guide.

The characteristic feature of the instrument is a removable blade situated on the slide, which ensures setting of the measuring edge of the tangential measuring feeler so that said measuring edge crosses the spindle axis of rotation. The above setting of the measuring feeler is an indispensable condition for providing the contact between its measuring edge and the tooth surface of the gear being measured at the pitch point in the course of measurement, and hence, for realization of the method of measuring the line of contact according to the invention. The preferable embodiment of the invention is characterized by the fact that the slide is provided with a saddle capable of moving across the direction of slide movement and having a rotatable spindle one end of which has a rigidly mounted bracket carrying the measuring carriage with the tangential measuring feeler while its other end is provided with a device for setting this carriage to an angle equal to the spiral or helix angle on the pitch cylinder of the gear being measured, the rotatable spindle being provided with a locating bore whose axis coincides with the axis of rotation of said spindle and which is intended for the installation of the removable blade.

An important feature of the invention lies also in the fact that the removable blade has the U-form of a cramp one side of which has an edge and the other side adjoins a cylindrical extention whose axis passes through said edge, perpendicularly to it. The extension is intended for the insertion into the locating bore of the spindle, with a provision for turning in it.

Another characteristic of the invention consists in that the device for setting the measuring carriage to an angle equal to the spiral or helix angle on the pitch cylinder of the gear being measured is made in the form of a sine bar free-mounted on the rotatable spindle which carried a rigidly mounted lever connecting said spindle with the sine bar by means of two locks located at the opposite ends of said sine bar, and another lever intended to shift the measuring carriage with the tangential measuring point through 180° for checking either the R.H. or L.H. tooth profile of the gear being measured.

Still another characteristic of the invention consists in that the elements designed for locating the instrument on the addendum circle diameter of the gear (while checking large helical gears) are made in the form of two cylindrical bars whose axes are perpendicular to the direction of the slide movement, while the slide carries a supporting strip intended for the installation of the gauge blocks which come in contact with the cylindrical bars when the edge of the tangential measuring point is aligned with the pitch point of the gear being checked.

An advantage of the instrument according to the invention lies in that the use of the removable blade makes it possible to determine easily the point on the edge of the tangential measuring point which must touch the line of contact of the gear at the pitch point.

Besides, the above-listed design features of the instrument ensure its easy resetting for checking the L.H. and R.H. profiles of the gear tooth, simple location of the instrument on the addendum circle diameter of large gear.

Other features and advantages of the invention will become apparent from the description that follows and the accompanying drawings in which:

FIG. 1 is a general perspective view of an instrument checking the line of contact of spur gears for according to the invention;

FIG. 2 is a section taken along line II—II passing through the axis of the rotatable spindle and the set-up of the instrument with relation to the gear being measured;

FIG. 3 is a view along arrow M of the reading device showing the position of the measuring carriage on its guide;

Figure 4:
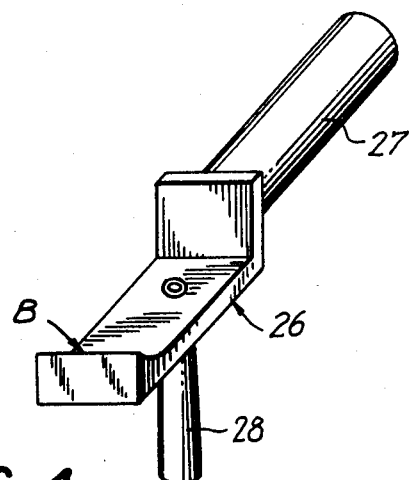
FIG. 4 is a perspective view of a removable blade.

The instrument provided by the invention comprises a base 1 (FIG. 1) secured to which are brackets 2 with two coaxial bars 3 which serve for locating the instrument on the addendum circle diameter of the gear being measured. Placed on the base 1 perpendicularly to the axis of the bars 3 is a guide 4 movably installed on which is a slide 5 with a guide 6 which is parallel to the axis of the bars 3. Secured to the slide 5 is also a strip 7 with two supports 8 intended for the installation carries a measuring feeler 17. The measuring feeler 17 is made in the form of a wedge whose upper side constitutes an extended portion with the surface parallel to the axis of the spindle 11, whereas the lower side of said wedge forms the measuring edge A inclined to said upper side through a normal pressure angle $\alpha\ \delta\ n$ at the pitch cylinder of the gear being measured. Secured to the upper part of the measuring carriage 14 is a measuring head 18 which is either a dial indicator or a transducer of, say, inductance type, for registering the motion of the measuring spindle 15. The measuring carriage 14 is moved along the guide 13 by means of a screw 19 and nut 20 connected with said carriage 14. For measuring the movement of the measuring carriage 14 along the guide 13 the former has a vernier 21 while the latter has a scale 22 (FIG. 3). The rotatable spindle 11 has a locating bore 25 (FIG. 2) whose axis coincides with the axis of this spindle. The bore 25 serves for locating a removable blade 26 designed for determining the position of the measuring carriage, at which the edge A of the tangential measuring feeler 17 crosses the axis of the spindle 11.

The removable blade 26 is made in U-shape one side of which has edge B which is essentially its measuring element (FIG. 4) while the other side adjoins a cylindrical extension 27 fitted into the locating bore 25 (FIG. 2) of the rotatable spindle 11. The axis of extension 27 passes through edge B (FIG. 4) perpendicularly to it so that, when the removable blade 26 (FIG. 2) is fitted in the locating bore 25 of the rotatable spindle 11, edge B (FIG. 4) passes through the axis of this rotatable spindle 11 (FIG. 2). The diameter of the extension 27 of the removable bore 26 ensures its turning in the locating bore 25 of the rotatable spindle 11. The removable blade 26 is turned by a handle 28.

Figure 5:
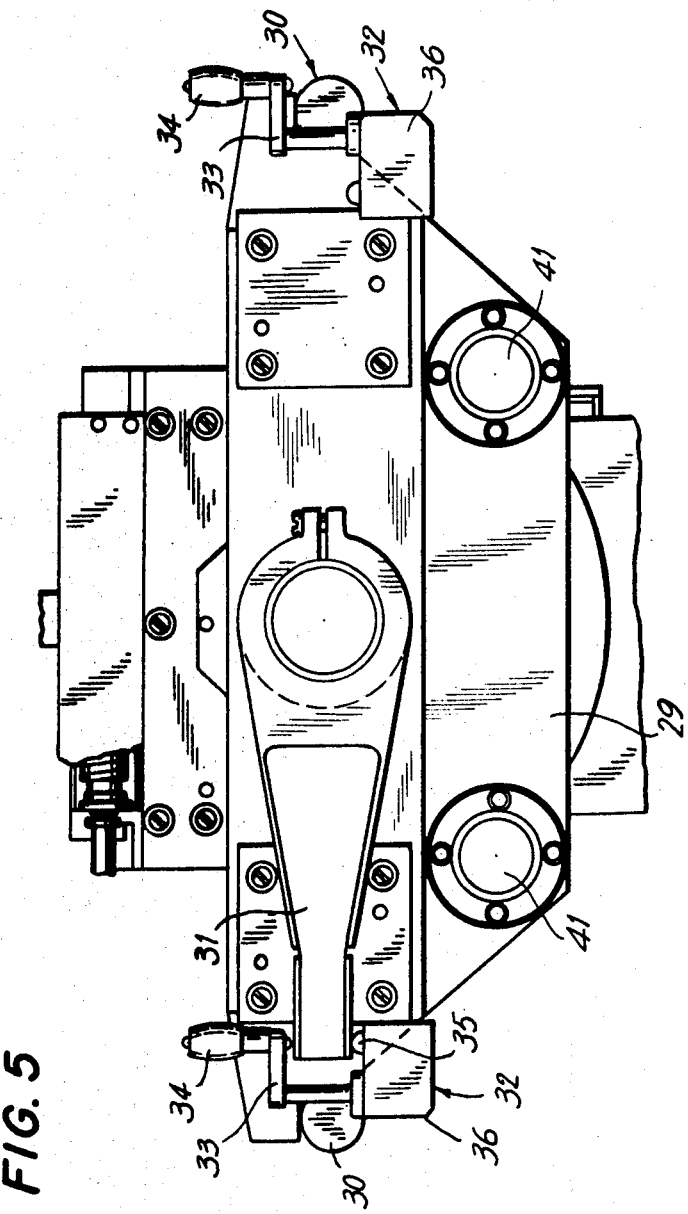
FIG. 5 is a view of the instrument from the side of the device for setting the measuring carriage to an angle equal to the spiral angle $\beta\ \delta\ n$ of the gear being measured.

The other end of the rotatable spindle 11 carries a device for setting the guide 13 of the measuring carriage 14 to an angle which is equal to the spiral or helix angle $\beta\delta n$ of the gear being measured. This device consists of a sine bar 29 (FIG. 5) having rollers 30 secured to it and being free-mounted on the rotatable spindle 11 so that it can turn in relation to the latter but is axially fixed with respect thereto, and a lever 31 rigidly fastened to the rotatable spindle 11. For connecting the lever 31 and, consequently, the rotatable spindle 11 with the sine bar 29, the opposite ends of the latter have locks 32 having, each, a swivelling spring-loaded stop 33 with a handle 34, and a fixed stop 35, installed on the platforms 36. The end of the lever 31 is fixed between the stops 33 and 35. The swivelling spring-loaded stop 33 is moved off in order to disengage the lever 31 from the sine bar 29.

Secured to saddle 9 (FIG. 1) is a table 37 with a serrated surface for placing gauge blocks 38 while the sine bar 29 is being set for spiral or helix angle on the pitch cylinder of the gear being measured. The sine bar 29 is set by rotating the spindle 11 with the aid of a worm 39 and a worm sheel secured to said spindle 11. For locking the sine bar 29 in position, it is provided with locking screws 41, which fasten it with the plate 42 which, in turn, is secured to the saddle 9. The rotatable spindle 11 can be turned through 180° for checking either the R.H. or L.H. profile of the gear tooth. For this purpose the sine bar 29 is disengaged from the spindle by releasing the lever 31 from the lock 32 and after turning through 180° the lever is fixed in the opposite lock 32.

The instrument is adjusted and operated as follows.

The removable blade 26 is inserted into the locating bore 25 (FIG. 2) of the rotatable spindle 11 so that its edge B (FIG. 4) is located approximately parallel to the direction of motion of the measuring carriage 14 (FIG. 2). The carriage 14 is moved by the screw 19 until edge A of the measuring feeler 17 comes in contact with edge B (FIG. 4) of the removable blade 26 (FIG. 2) approximately near the axis of the rotatable spindle 11. Then the removable blade 26 is rocked by the handle 28 about the axis of the rotatable spindle 11 and the measuring carriage 14 is moved along the guide 13 until this rocking of the removable blade 26 stops changing the readings of the measuring head 18. This means that point C on the edge of the measuring feeler 17 contacting the edge of the removable blade 26 lies on the axis of the rotatable spindle 11. In this initial position for measuring of the carriage 14, the readings of the scale 22 (FIG. 3) and vernier 21 are marked. Then the measuring carriage 14 (FIG. 2) is moved aside along the guide 13, the removable blade 26 is taken from the locating bore 25 of the rotatable spindle 11 and the carriage 14 is again returned to the initial position. Then, depending on whether the L.H. or R.H.

profile of the tooth is to be checked, the measuring carriage 14 with the measuring feeler 17 is set to one of the two positions in which edge A of the tangential measuring feeler 17 is directed towards the L.H. or R.H. profile.

Should it become necessary to shift the measuring carriage 14 through 180°, the sine bar 29 (FIG. 1) is locked by means of locking screws 41, the lever 31 is disengaged from the lock 32 by withdrawing the swiveling spring-loaded stop 33, the rotatable spindle 11 is turned by means of the worm 39 and, when the lever 31 of the opposite lock 32 touches upon the fixed stop 35, the latter is fixed in position by turning the spring-loaded stop 33 of the same lock. Then the guide 13 of the measuring carriage 14 is turned to an angle equal to the spiral or helix angle $\alpha \eta \ n$ on the pitch cylinder of the gear being checked. For this purpose, the locking screws 41 are loosened, releasing the sine bar 29, gauge blocks 38 of an appropriate size are put on the table under the rollers 30 of the sine bar 29, and the rotatable spindle 11 is turned until the rollers 30 of the sine bar 29 come in contact with the gauge blocks 38.

Then the sine bar 29 is locked with locking screws 41.

Figure 6:
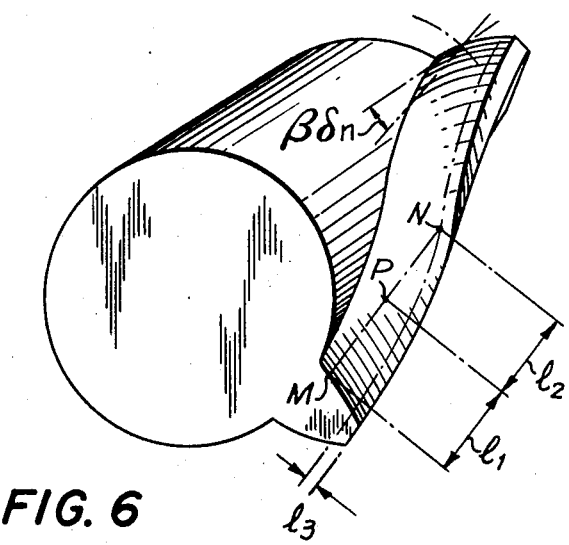
FIG. 6 is a perspective view showing the tooth of a helical gear with flanks, and the position of the line of contact on the tooth surface.

Next the instrument is placed on a tooth-cutting machine (not shown) or on a stand where the gear 43 to be checked is held in the centers or by some other method; the cylindrical bars 3 are brought to the outer surface of the gear 43. The instrument must be so located in height with relation to the gear 43 that the axis of the rotatable spindle 11 is aligned in the diametrical plane of the gear 43. Having placed the gauge blocks (not shown) on the platforms 8 of the strip 7 the slides 5 are moved until said gauge blocks come in contact with the cylindrical bars 3. The size of these gauge blocks should be pre-calculated so that during their contact with the cylindrical bars 3 point C on the edge of the measuring feeler 17 coincides with the pitch cylinder of the gear being checked. Then the saddle 9 (FIG. 1) is moved along the guide 6 until the measuring feeler 17 comes in contact with the tooth profile of the gear 43 (FIG. 2) at the pitch point P (FIG. 6). In this position the instrument is ready for operation. Operation of the instrument consists in moving the measuring carriage 14 (FIG. 1) by the screw 19 along the guide 13. In this case the feeler traces the tooth profile along the line of contact MPN (FIG. 6) and the measuring head 18 (FIG. 1) detects the motions of the measuring spindle 15 with the measuring feeler 17, these motions being caused by the deviations from straightness and direction of said line of contact. To reiterate, the edge A of the feeler 17 is coincided with the tooth surface at the pitch point P by reason of the following steps:

a. the measuring carriage 14 (with the feeler 17) is so adjusted on the guide 13, that the edge A of the feeler crosses the axis of rotation of the spindle 11;

b. the sine bar 29 is utilized to turn the spindle 11 and, hence, the bracket 12 attached thereto with the guide 13, the carriage 14 and the feeler 17 through an angle equal to the tooth spiral angle on the pitch cylinder;

c. the instrument is installed so that the axis of rotation of spindle 11 is in the horizontal diametrical plane of the gear 43 being checked, the bars 3 being in contact with the addendum circle of the gear being measured;

d. the slide 5 is moved along the guide 4 toward the gear 43 being checked to introduce the feeler 17 into the tooth space so that point C (on the edge A of feeler 17 crossing the axis of rotation of spindle 11) is at the pitch cylinder of the gear 43 being measured; this is ensured by the contact of gauge blocks on the platform 8 with the bars 3;

e. the saddle 9 is moved along the guide 6 until the above point on the edge A of the feeler 17 touches the tooth surface. The point at which said point touches the tooth profile after performing the above steps is the pitch point P.

The length of the portions of the line of contact from the pitch point P (FIG. 6) to the beginning of the line of contact near the tooth root 1, and to the beginning of the flank $l_2$ is calculated on the basis of the parameters of the gear 43 being checked (FIG. 2). Point N (FIG. 6) is located on the intersection of the line of contact with the flank whose height is $l_3$. By moving the measuring carriage 14 (FIG. 1) from the pitch point P (FIG. 6) to point N of intersection of the line of contact with the flank (the moment when the tangential measuring feeler 17 crosses point N is determined by a sharp change in the readings in measuring head 18), the actual distance $l_2$ is determined on the scale 22 (FIG. 3) and vernier 21 and is compared with the design value of $l_2$ (FIG. 6). The difference between the actual and design values of the portion of the line of contact PN defines the value of the flank size. In the same manner it becomes possible to determine the length of the line of contact along the tooth root.

The above description discloses an instrument for checking the line of contact of sput gears, mainly large ones, said instrument being set up in operation directly on a tooth-cutting machine or a test stand where the axis of the gear 43 (FIG. 2) being checked is arranged horizontally. For vertical positioning of the gear 43 there is no need for introducing any radical changes into the adjustment and design of the instrument. The only changes include shifting the cylindrical bars 3 to a vertical position and changing the direction of movement of the saddle 9 (FIG. 1) for bringing the tangential measuring feeler 17 in contact with the tooth profile.

Within the scope of the present invention there may be other designs of the instruments wherein the guide of the measuring carriage with the tangential measuring feeler is turned to an angle equal to the spiral or helix angle on the pitch cylinder of the gear, and the removable blade is mounted by other methods than in the embodiment of the invention described above. However, in all cases the turning axis of the measuring carriage should lie in the diametrical plane of the gear and the edge of the removable blade must cross this axis and be perpendicular to the edge of the tangential measuring feeler which will ensure such a setting of the tangential measuring feeler, at which the edge of the latter crosses the measuring carriage turning axis, thus providing for the tangential feeler measuring edge to come into contact with the tooth surface of the gear being measured at the pitch point in the course of measurement.

What is claimed is:

1. An instrument for checking the line of contact of helical gears comprising a base, a slide mounted on said base for reciprocal movement thereon, means for locating the instrument relative to the addendum circle diameter of the gear being measured and including two cylindrical bars of the same diameter secured to the base at opposite sides of said slide, said cylindrical bars being coaxial and extending perpendicular to the direction of travel of the slide; a saddle installed on said slide for movement transversely of the movement of said slide; a spindle rotatably mounted in said saddle and having an axis of rotation parallel to the direction of travel of the slide; said spindle having one end facing said bars and being provided at said end with a bore whose axis coincides with the axis of rotation of the spindle; a bracket mounted on said one end of the spindle; a guide on said bracket; a measuring carriage mounted on said guide for movement in a direction normal to the axis of rotation of the spindle; means for setting said bracket and said measuring carriage through an angle equal to the spiral angle on the pitch cylinder of the gear being measured, the latter said means being mounted at the other end of the spindle; a measuring head secured on said measuring carriage; a tangential measuring instrument mounted on said measuring carriage and movable in a direction normal to the direction of travel of the measuring carriage and acting on said measuring head when the carriage is in motion, said tangential measuring instrument having a measuring edge inclined to the axis of rotation of the spindle by an angle equal to a generating angle of the gear being checked, a removable blade mounted in said spindle bore and having an edge extending normal to the axis of rotation of the spindle and crossing said axis; said removable blade serving to located said instrument such that the measuring edge thereof crosses the axis of rotation of the spindle, and means mounted on said measuring carriage for indicating the position of said measuring carriage on the guide on said bracket.

2. An instrument according to claim 1 wherein the removable blade is of U-shape with said measuring edge at one side and a cylindrical extension at the other side, having an axis passing through said measuring edge, perpendicularly thereto, said extension being adapted for the insertion into the locating bore of the rotatable spindle with capability of rotation.

3. An instrument according to claim 1 wherein the means for setting said bracket and the measuring carriage to an angle equal to the spiral angle on the pitch cylinder of the gear being checked comprises a sine bar mounted on the rotatable spindle so that it can rotate relative to the latter but is locked therein in axial direction, a rigidly secured lever connecting said rotatable spindle with said sine bar for shifting said measuring carriage and the measuring edge of said measuring instrument through 180° depending on whether the right hand or left hand profile of the gear tooth is to be traced.

* * * * *